United States Patent
Park et al.

(10) Patent No.: US 7,936,159 B2
(45) Date of Patent: May 3, 2011

(54) METHOD AND APPARATUS FOR A HIGH VOLTAGE POWER SUPPLY CIRCUIT

(75) Inventors: Chan Woong Park, Seoul (KR); Leif O. Lund, San Jose, CA (US)

(73) Assignee: Power Integrations, Inc., San Jose, CA (US)

( * ) Notice: Subject to any disclaimer, the term of this patent is extended or adjusted under 35 U.S.C. 154(b) by 642 days.

(21) Appl. No.: 12/047,129

(22) Filed: Mar. 12, 2008
(Under 37 CFR 1.47)

(65) Prior Publication Data
US 2009/0033307 A1 Feb. 5, 2009

Related U.S. Application Data

(60) Provisional application No. 60/919,842, filed on Mar. 23, 2007.

(51) Int. Cl.
*G05F 1/40* (2006.01)
(52) U.S. Cl. ........................................ 323/284; 323/271
(58) Field of Classification Search .................. 323/271, 323/282, 284, 285, 288, 351
See application file for complete search history.

(56) References Cited

U.S. PATENT DOCUMENTS

| 6,922,345 | B2 * | 7/2005 | Nishida et al. | 363/21.16 |
| 7,463,497 | B2 | 12/2008 | Negrete | |
| 7,595,624 | B2 * | 9/2009 | Tateishi et al. | 323/288 |
| 2009/0033393 | A1 * | 2/2009 | Park et al. | 327/175 |

FOREIGN PATENT DOCUMENTS

| JP | 2003-169469 | 6/2003 |
| JP | 2003-244953 | 8/2003 |
| KR | 10-2008-0039774 | 5/2008 |

* cited by examiner

*Primary Examiner* — Jessica Han
(74) *Attorney, Agent, or Firm* — Blakely Sokoloff Taylor & Zafman LLP

(57) ABSTRACT

A control circuit for use in a power supply is disclosed. An example control circuit according to aspects of the present invention includes a signal generator coupled to generate an output signal to control switching of a power switch to be coupled to the control circuit. A feedback circuit is coupled to receive a feedback signal, which is representative of an output of the power supply during a feedback portion of an off time of the power switch. The signal generator generates the output signal in response to the feedback circuit to control a fraction of the feedback portion of the off time of the power switch that the feedback signal is above a threshold and another fraction of the feedback portion of the off time of the power switch that the feedback signal is below the threshold.

67 Claims, 8 Drawing Sheets

US 7,936,159 B2

METHOD AND APPARATUS FOR A HIGH VOLTAGE POWER SUPPLY CIRCUIT

REFERENCE TO PRIOR APPLICATION(S)

This application claims the benefit of U.S. Provisional Application No. 60/919,842, filed Mar. 23, 2007, entitled "METHOD AND APPARATUS FOR A HIGH VOLTAGE POWER SUPPLY CIRCUIT."

BACKGROUND INFORMATION

1. Field of the Disclosure

The present invention relates generally to control circuits and, more specifically, the present invention relates to control circuits used in a power converter that regulate the power converter output.

2. Background

Power converter control circuits may be used for a multitude of purposes and applications. Due to requirements to reduce power converter cost, there is a demand for control circuit functionality to reduce external component count for components external to the integrated control circuit. This reduction in external component count enables miniaturization of the power converter to improve portability, reduces the number of design cycles required to finalize a power converter design and also improves reliability of the end product. Furthermore, reduced component count can offer energy efficiency improvements in the operation of the power converter and can reduce the power converter cost. One aspect of the power converter offering the potential for component count reduction is in simplifying or removing the external circuitry previously required to achieve output voltage regulation in a power converter.

In isolated flyback converters used for AC/DC power conversion, the output voltage is typically measured across the isolated power supply output terminals to generate a continuous feedback signal that is coupled to a control circuit on the primary, also referred to as the input, of the power supply, typically employing an opto-coupler to provide isolation between power supply input and output circuitry. The control circuit is responsive to the feedback signal to control switching of a power switch coupled to a winding of an energy transfer element to regulate power delivered from the input to the output of the power converter.

In other flyback converters, a feedback signal is generated using an auxiliary winding forming part of the power converter transformer or energy transfer element. The flyback voltage across the auxiliary winding is rectified and smoothed to generate a feedback signal that is coupled to a control circuit on the primary side of the converter.

In buck converters a feedback signal representative of the power converter output voltage is typically generated by rectifying and smoothing the voltage across the main inductor or energy transfer element winding during the off time of a power switch.

In both flyback and buck converter configurations, the power switch is coupled to a power supply input and to the energy transfer element such that a current flows from the power supply input through the power switch and the energy transfer element when the power switch is in an ON state.

BRIEF DESCRIPTION OF THE DRAWINGS

Non-limiting and non-exhaustive embodiment and examples of the present invention are described with reference to the following figures, wherein like reference numerals refer to like parts throughout the various views unless otherwise specified.

DETAILED DESCRIPTION

Methods and apparatuses for implementing a control circuit for regulating a power converter output are disclosed. In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. In addition, it is appreciated that the figures provided herewith are for explanation purposes to persons ordinarily skilled in the art and that the drawings are not necessarily drawn to scale.

A control circuit for regulating a power converter output in accordance with the teachings of the present invention will now be described. Examples of the present invention involve methods and apparatuses to regulate a power converter output.

Figure 1:
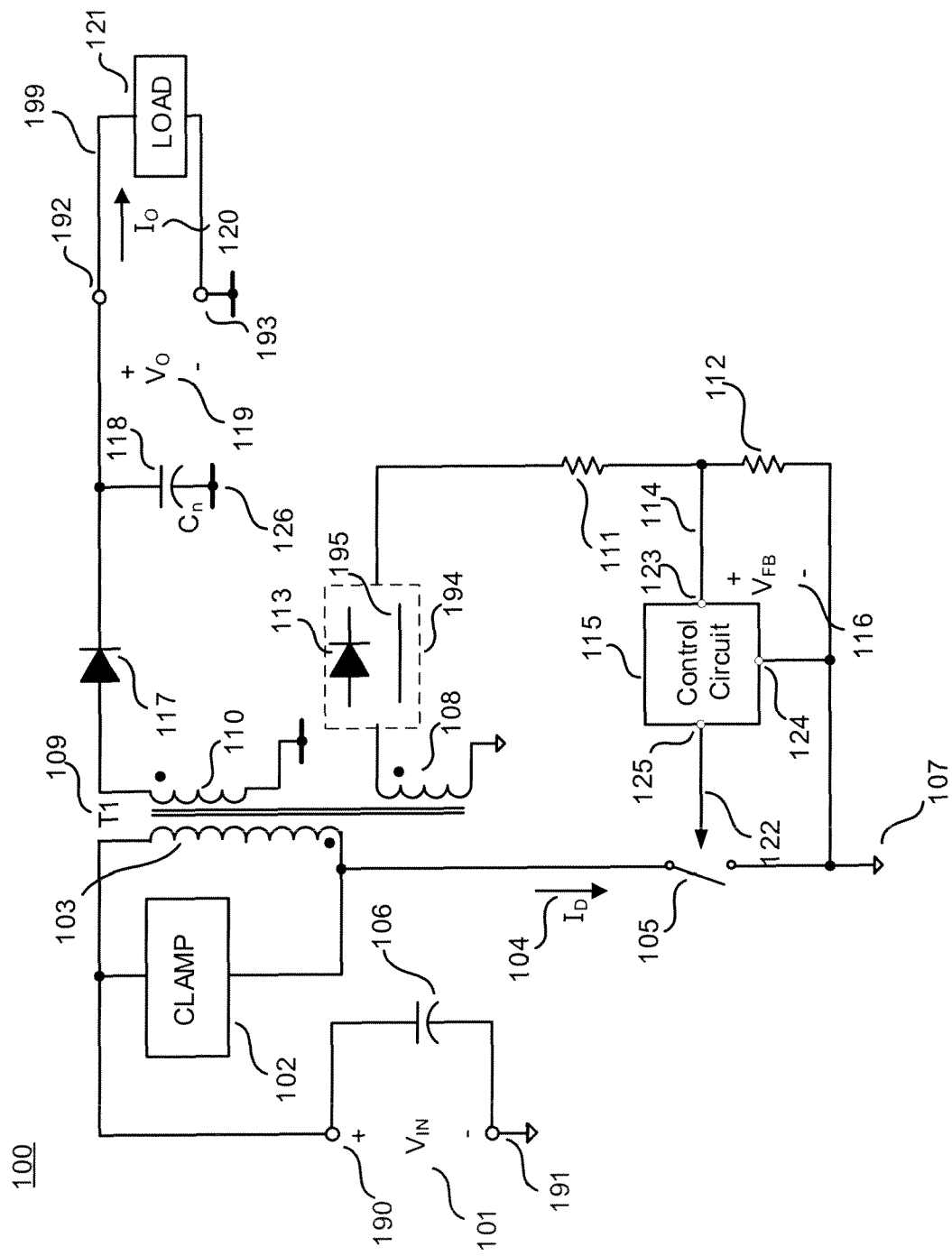
FIG. 1 is a schematic illustrating generally an example flyback power supply employing a control circuit responsive to a feedback signal that may regulate an output of the power supply in accordance with the teachings of the present invention.

FIG. 1 shows generally a schematic of a power converter 100, also referred to herein as a power supply, employing a control circuit that regulates an output voltage of the power converter in accordance with the teachings of the present invention. In one example, power converter 100 is an isolated flyback converter where primary ground 107 and secondary return 126 are isolated from one another. It is noted that in other examples, power converter 100 could also be a non-isolated flyback converter in accordance with the teachings of the present invention. It is noted that in other examples power converter 100 could have more than one output in accordance with the teachings of the present invention.

As shown, a control circuit 115 is coupled to a power switch 105, which in one example is a metal oxide semiconductor field effect transistor (MOSFET) semiconductor switch, a bipolar transistor or the like. Power switch 105 is coupled to an input winding 103 of energy transfer element 109, which is coupled to a DC input voltage 101 and an output power diode 117. In one example, DC input voltage 101 is the output of a rectifier circuit coupled to a source of AC voltage not shown. Capacitor 106 is coupled to power converter input terminals 190 and 191 to provide a low impedance source for switching currents flowing through first and second input terminals 190 and 191, energy transfer element 109 winding 103 and power switch 105 when the power switch 105 is in an ON state. In one example, control circuit 115 and switch 105 could form part of an integrated circuit that could be manufactured as a hybrid or monolithic integrated circuit. Control circuit 115 is coupled to receive a feedback signal 114, which in one example is a voltage signal, but in another example could be a current signal or other signal indicative of the power supply output while still benefiting from the teachings of the present invention.

In the example, control circuit 115 is coupled to regulate energy delivered from the first and second input terminals 190 and 191 of power converter 100 to the power converter output terminals 192 and 193 coupled to load 121. In one example, the specific output parameter being regulated is the DC output voltage 119. Energy transfer element 109 comprises input winding 103 and output winding 110 and an auxiliary winding 108. The feedback signal 114 is coupled to control circuit 115 from auxiliary winding 108 through the resistor divider formed by resistors 111 and 112.

In operation, control circuit 115 regulates the output of power supply 100 by switching power switch 105 in response to the feedback signal 114. When switch 105 is on, energy from the capacitor 106 is transferred into the input winding 103 of the energy transfer element 109. When the switch is off, the energy stored in the input winding 103 is transferred to the output winding 110. The energy from output winding 110 is transferred to the output of the power supply 100 with a current that flows through a forward biased output power diode 117 to output capacitor 118 and the load 121 coupled to the output terminals 192 and 193. While current flows through the output power diode 117 during the off period of switch 105, the output voltage $V_O$ 119 across load 121 plus the forward voltage drop across output power diode 117 is substantially equal to the voltage across the output winding 110.

As will be discussed, this portion of the off time of the power switch when the voltage across the output winding 110 is representative of the output voltage $V_O$ 119 while current flows through the output diode will be referred to as a feedback portion $T_{FB}$ of the off time of the power switch 105. In some cases, the current may substantially stop flowing from output winding 110 through the output power diode 117 during the off period of power switch 105. In this case, the output power diode 117 becomes reversed biased and the voltage drop across output winding 110 is no longer representative of the output voltage $V_O$ 119. This portion of the off time of the power switch 105 when substantially no current flows through output power diode 117 may be referred to as the no feedback portion of the off time of the power switch 105.

The voltage across the output winding 110 is reflected to an auxiliary winding 108 of the energy transfer element based on the turns ratio. The voltage across the auxiliary winding 108 may therefore be employed during the feedback portion $T_{FB}$ of the off time of the power switch 105 to obtain a feedback signal 114 regarding the output of power supply 100, which is coupled to be received by the control circuit 115 to control switching of the power switch 105 to regulate the output of power supply 100.

In one example, a circuit block 194 coupled to the auxiliary winding 108 includes a diode 113 as shown in FIG. 1. During the on time of power switch 105, auxiliary winding diode 113 is reverse biased and therefore prevents current flow in resistors 111 and 112. In another example, circuit block 194 includes a substantially short circuit connection 195 as shown while still benefiting from the teachings of the present invention.

In the example where circuit block 194 includes the substantially short circuit connection 195, a signal is applied to terminal 123 of control circuit 115 during the on time of the power switch 105. However, this signal is a feedforward signal that is not representative of the output voltage of the power converter. Thus, in the example where circuit block 194 includes the substantially short circuit connection 195, signal 114 is still therefore only a feedback signal representative of the output voltage 119 of power converter 100 during the off time of power switch 105. In one example, signal 114 is a feedback signal representative of the output voltage 119 of power converter 100 during only a portion of the off time of power switch 105, as will now be described with reference to the example illustrated in FIG. 2.

Figure 2:
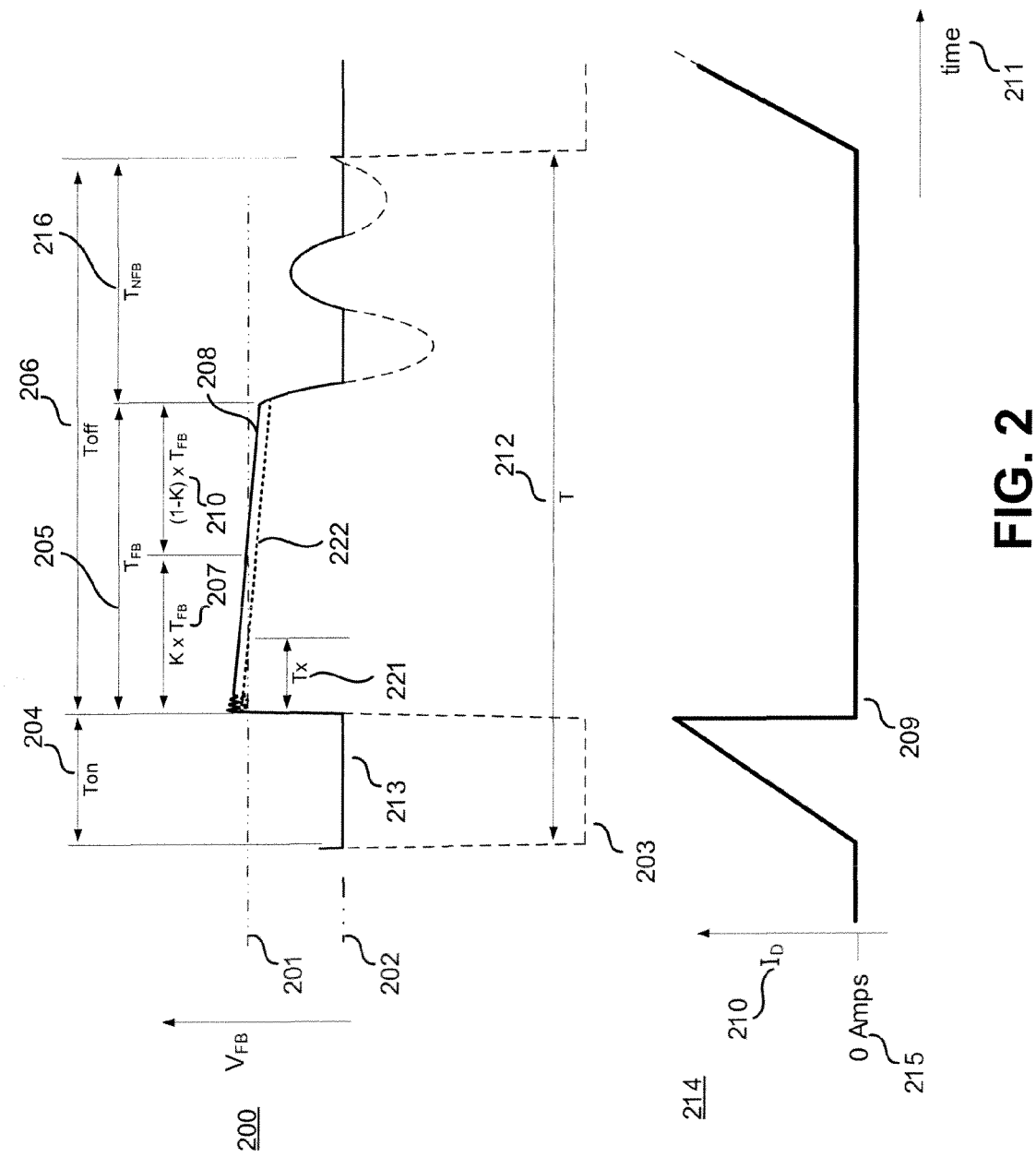
FIG. 2 shows generally waveforms for a power supply employing an example control circuit responsive to a feedback signal to regulate an output voltage of a power supply in accordance with the teachings of the present invention.

FIG. 2 shows example waveforms that help illustrate the operation of the example circuit of FIG. 1. For instance, waveform 200 is a voltage waveform of $V_{FB}$ 116 in FIG. 1. As will be discussed, waveform 200 may be used in one example to provide feedback to the control circuit 115 regarding the output voltage $V_O$ 119 during a feedback portion $T_{FB}$ 205 of the off period Toff 206 of waveform 200. In the illustrated example, no feedback information is provided during the no feedback portion $T_{NFB}$ 216 of waveform 200. Waveform 214 is a current waveform of the Drain current 104 flowing in power switch 105 in FIG. 1. In the illustrated example, the waveform 214 is shown as a discontinuous current waveform since the Drain current waveform 209 starts from substantially zero current 215 each time the power switch 105 turns on.

In each switching cycle, the power switch is on for an on time period Ton 204 and is off for an off time period Toff 206. During the feedback portion $T_{FB}$ 205 of off time Toff 206, output power diode 117 is forward biased such that current is flowing in the output power diode 117 of power converter 100. The voltage appearing across output winding 110 at this time during $T_{FB}$ 205 is therefore substantially equal to output voltage 119 plus the forward bias voltage drop of power diode 117. It is noted that during the no feedback portion $T_{NFB}$ 216 of the off time Toff 206 shown in the example of FIG. 2, output diode 117 is no longer forward biased and no substantial current flows through the output power diode 117. At this time during $T_{NFB}$ 216, the voltage appearing across output winding 110 does not provide feedback information regarding output voltage 119.

When output power diode 117 is forward biased, the amount of current that flows in output power diode 117 is substantially equal to a sum of a current flowing in the output capacitor 118 and output current 120 flowing in the load 121. Since the forward voltage of diode 117 while current is flowing through diode 117 is substantially known through manufacturers data, the voltage appearing across winding 110 is therefore representative of the output voltage 119. Furthermore, the voltage appearing across winding 108 is related to the voltage across winding 110 through the turns ratio of windings 110 and 108. In other words, the voltage across winding 110 is reflected onto the voltage across winding 108 depending on the respective turns ratio. For example, if windings 110 and 108 have the same number of turns, the voltage appearing across winding 110 and winding 108 during the feedback portion $T_{FB}$ 205 of the off time Toff 206 will, to a first order, be substantially equal. Second order influences such as leakage inductance and interwinding capacitance are not detailed here so as not to obscure the teachings of the present invention. During the feedback portion $T_{FB}$ 205 of the off time Toff 206, the voltage appearing across winding 108 is therefore also representative of output voltage 119.

Since feedback signal 114, which in this example is $V_{FB}$ 116, is related to the voltage appearing across winding 108 through the known circuit block 194 and resistor divider formed by resistors 111 and 112, the feedback signal 114 is representative of an output voltage of the power supply during the feedback portion $T_{FB}$ 205 of the off time Toff 206 of the switch. It will be noted that there is a slope, exaggerated in FIG. 2 for the purposes of explanation, on feedback voltage waveform 208 during the feedback portion $T_{FB}$ 205 of the off time Toff 206 primarily due to impedances in the output circuit of the power supply. Such impedances include the forward impedance of diode 117, which includes a resistive element and a series impedance of output capacitor 118, which includes a resistive element.

It is noted that during the power switch 105 on time period Ton 204, the voltage appearing at feedback terminal 123 in FIG. 1 is substantially zero volts relative to ground terminal 124 if circuit block 194 comprises a diode 113 or if there is an internal clamp (not shown) coupled to terminal 123. This case is shown by voltage level 213 in FIG. 2 which is substantially equal to the ground voltage 202.

In an example circuit configuration where the control circuit 115 in FIG. 1 does not have an internal clamp coupled to terminal 123 and when the circuit block 194 comprises the substantially short circuit connection 195, the voltage appearing at feedback terminal 123 will follow a characteristic of the type shown by dotted line 203 in FIG. 2. In either case, the feedback signal 208 in the illustrated example is only representative of an output voltage 119 of the power converter 100 during the feedback portion 205 of the off time Toff 206.

Figure 3:
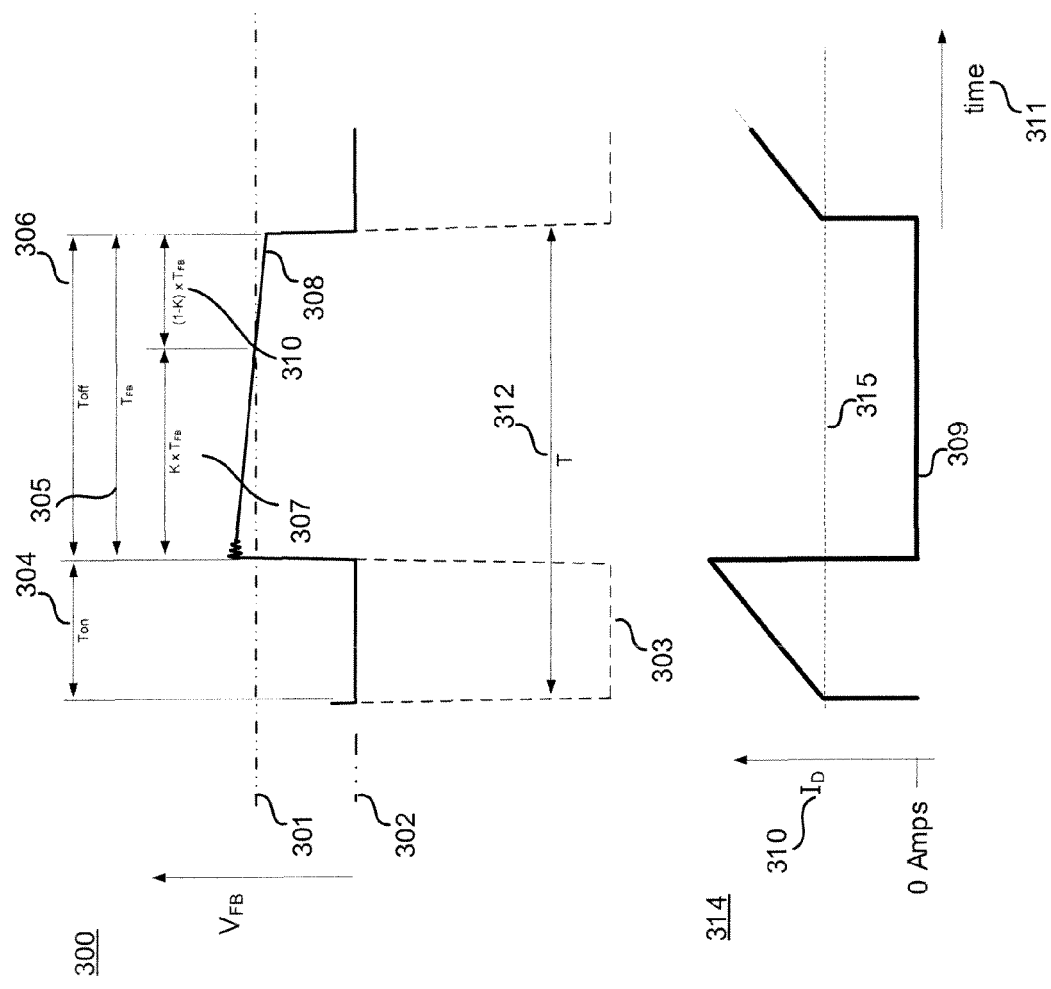
FIG. 3 shows generally waveforms for a power supply employing an example control circuit responsive to a feedback signal to regulate an output voltage of a power supply in accordance with the teachings of the present invention.

FIG. 3 shows example waveforms that further help illustrate the operation of the circuit of FIG. 1. Waveform 300 is a voltage waveform of $V_{FB}$ 116 in FIG. 1. Waveform 314 is a current waveform of the Drain current 104 flowing in power switch 105 in FIG. 1. The example waveform 314 shown in FIG. 3 is a continuous current waveform since the Drain current waveform 309 starts rising from a non-zero current level 315 after each time the power switch 105 turns on. In each switching cycle, the power switch is on for an on time period Ton 304 and is off for an off time period Toff 306.

In the example waveforms illustrated in FIG. 3, it is noted that the feedback portion $T_{FB}$ 305 of off time Toff 306 is substantially equal to the entire off time Toff 306. This indicates that the power output power diode 117 is forward biased and that current is therefore flowing in the power output power diode 117 for substantially all of the off time period of the power switch 105. The voltage appearing across output winding 110 is therefore substantially equal to output voltage 119 plus the forward voltage drop of diode 117 during the entire off time period Toff 306. By the same explanation applied to the waveforms of FIG. 2 above therefore, feedback signal 114 or $V_{FB}$ 116 is representative of the output voltage of the power converter during $T_{FB}$ 305, which in the case of FIG. 3 is substantially the entire off time period Toff 306 of the power switch 105.

Figure 4:
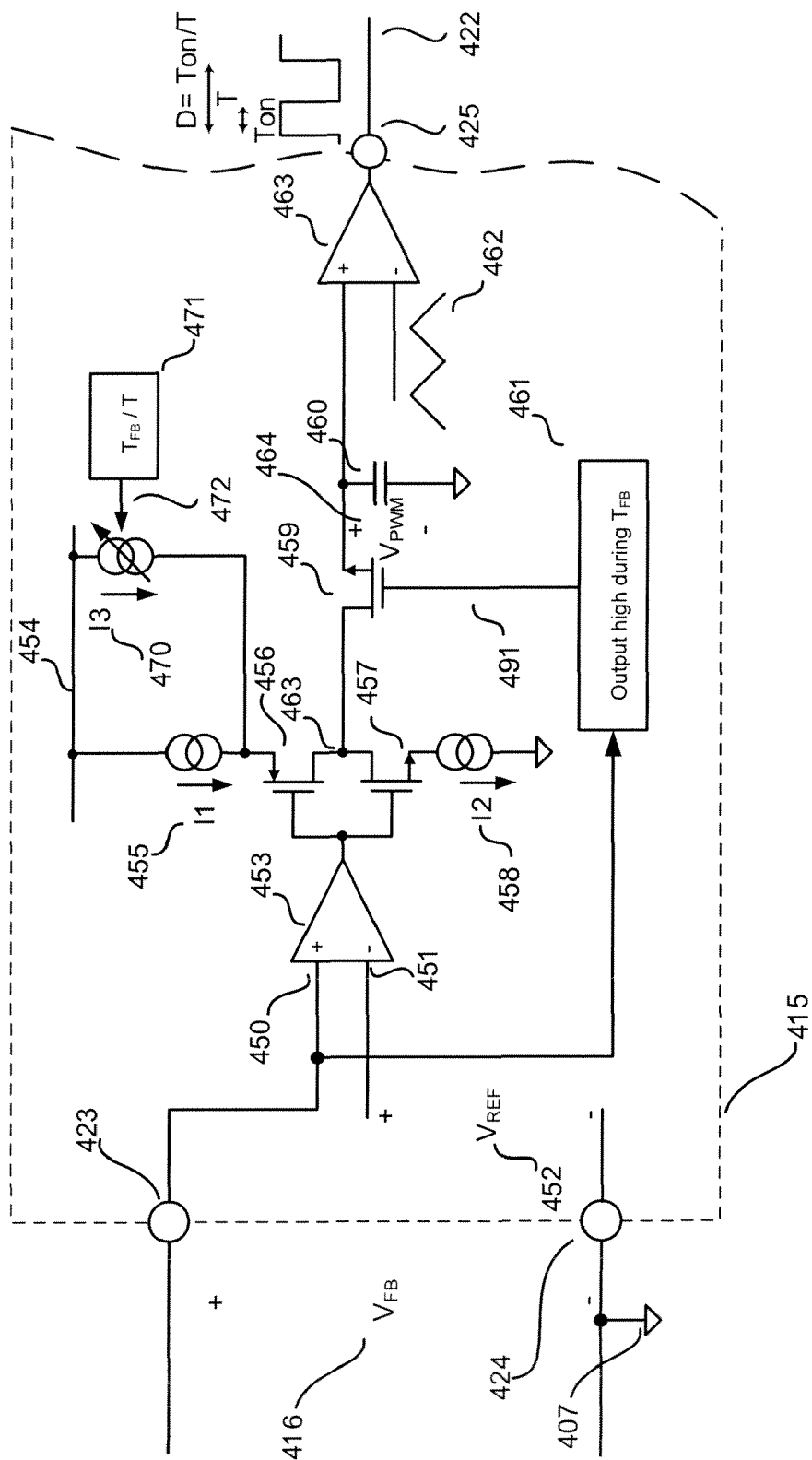
FIG. 4 is a more detailed schematic illustrating a portion of an example control circuit in accordance with the teachings of the present invention.

FIG. 4 shows generally a schematic of a circuit 400, which may be a more detailed example schematic of a portion of control circuit 115 in FIG. 1 in accordance with the teachings of the present invention. The circuitry of FIG. 4 is one example of a circuit that, when coupled to receive a feedback signal representative of an output voltage of a power converter during the feedback portion 205 or 305 of the off time of the switch, could regulate power delivery from an input of a power converter to an output of the power converter in accordance with the teachings of the present invention.

As shown in the depicted example, control circuit 415 is coupled to receive a feedback signal $V_{FB}$ 416 at feedback terminal 423 relative to ground terminal 424. In one example, control circuit 415 includes feedback circuitry, which includes comparator 453, switches 456, 457, 459, feedback capacitor 460 and current sources 455 and 458. Feedback voltage $V_{FB}$ 416 is coupled to non-inverting input 450 of comparator 453. A reference voltage $V_{REF}$ 452 is applied to inverting input 451 of comparator 453. In one example, reference voltage $V_{REF}$ 452 is equivalent to voltage threshold value 201 in FIG. 2 and voltage threshold value 301 in FIG. 3. The output of comparator 453 is coupled to drive transistor switches 456 and 457 such that, when $V_{FB}$ 416 is $>V_{REF}$ 452, switch 457 is turned on and when $V_{FB}$ 416 is $<V_{REF}$ 452 switch 456 is turned on.

As shown in the illustrated example, circuit block 461 is coupled to drive switch 459 such that switch 459 is in an on state only during the feedback portion $T_{FB}$ 205 of the off period Toff 206 in the example of FIG. 2, or $T_{FB}$ 305 in the example of FIG. 3. Current can therefore only flow into or out of feedback capacitor 460 during $T_{FB}$ 205 or 305. In one example, circuit block 461 is coupled to determine the feedback portion $T_{FB}$ 205 of the off period 206 by comparing feedback signal 416 with a threshold voltage level to drive switch 459 with a logic high input signal when feedback signal 416 is greater than the threshold voltage level to determine whether the output power diode 117 is conducting current. The duration for which switch 459 is driven by circuit block 461 with the logic high input signal is substantially equal to the period $T_{FB}$ 205 when current flows through power output diode 117 in FIG. 1. The voltage $V_{PWM}$ 464 appearing across feedback capacitor 460 is coupled to pulse width modulator (PWM) comparator 463 and compared to a PWM waveform 462 to generate a variable duty cycle output 422 at output terminal 425 in response to the magnitude of the voltage $V_{PWM}$ 464. In one example, PWM waveform 462 is a ramp signal or a triangular waveform or the like.

In one example, PWM comparator 463 is part of a signal generator of circuit 400 to generate signal 422, which could be equivalent to signal 122 in FIG. 1. In one example, the signal generator could include an oscillator providing a signal to initiate the on time of the power switch cycle. The oscillator signal could be substantially fixed in frequency, or its frequency can be modulated to reduce EMI in the system, or be varied under certain conditions to reduce power consumption or increase efficiency without departing from the teachings of the invention. In another example, the signal generator could also include circuitry to logically combine other signals with signal 422 to generate signal 122 such as protective current limit and thermal shutdown signals and the like in accordance with the teachings of the present invention. It is noted that in another example, the voltage $V_{PWM}$ 464 could also be filtered with a low pass filter coupled between feedback capacitor 460 and the non-inverting input of PWM comparator 463 in accordance with the teachings of the present invention.

In the illustrated example, since current can only flow in transistor switch 459 when it is in an on state, the voltage $V_{PWM}$ 464 is only responsive to the output of comparator 453 and therefore the feedback signal 416, during the feedback portion $T_{FB}$ 205 in FIG. 2 or 305 in FIG. 3 of the off time Toff 206 or 306. Continuing with the example described above, feedback capacitor 460 is discharged with a current I2 458 through transistor switch 459 during a portion of the feedback portion $T_{FB}$ 205 or 305 while the feedback signal voltage 416 is greater than the reference voltage $V_{REF}$ 452. Referring back to the examples shown in FIG. 2 and FIG. 3, this corresponds to the portions of $T_{FB}$ 205 or $T_{FB}$ 305 that are labeled as time periods K×$T_{FB}$ 207 in FIG. 2 or K×$T_{FB}$ 307 in FIG. 3, respectively, where K is a variable having a value less than 1. Remaining portions of $T_{FB}$ 205 or $T_{FB}$ 305 are labeled as time periods (1−K)×$T_{FB}$ 210 in FIG. 2 or (1−K)×$T_{FB}$ 310 in FIG. 3, respectively. In the (1−K)×$T_{FB}$ portions, the feedback capacitor 460 is charged with a current I1 455 through transistor switch 459 while the feedback signal voltage 416 is less than the reference voltage $V_{REF}$ 452.

In an example where current I1 455 and current I2 458 are substantially equal, the average of voltage $V_{PWM}$ 464 will remain constant if variable K has a value substantially equal to 0.5. During the operation of power converter 100, if output current 120 suddenly increases, the output capacitor 118 starts to discharge and output voltage 119 is reduced. As a consequence, the feedback voltage $V_{FB}$ 416 during the feedback portion $T_{FB}$ 205 of the off time Toff 206 of power switch 105 is also reduced. This example is illustrated in FIG. 2 where the feedback signal voltage 222 during feedback portion $T_{FB}$ 205 is reduced compared to the feedback signal voltage 208, which represents the feedback signal level when the load current 120 in FIG. 1 is stable. Under this transient load condition, the feedback signal voltage during feedback portion $T_{FB}$ 205 is greater than the reference voltage threshold value 201 for a time Tx 221, which is less than the time period 207 under stable load conditions.

Referring back to FIG. 4, therefore, since the feedback signal voltage 416 during time period 205 is greater than the reference voltage threshold value 452 for a shorter time, feedback capacitor 460 is discharged for a shorter time resulting in the voltage $V_{PWM}$ 464 across feedback capacitor 460 increasing. This in turn increases the duty cycle of the output signal 422, which in one example results in an increase in the on time percentage or duty cycle of the power switch 105 in FIG. 1. The power delivered to the power supply output therefore increases tending to bring the feedback voltage in FIG. 2 back to steady state level 208. This restores the condition of equal charge and discharge of feedback capacitor 460 in FIG. 4 such that the average voltage of $V_{PWM}$ 464 becomes substantially constant.

It will be noted that a similar explanation could be applied to the waveforms of FIG. 3. It will also be noted that the opposite effect happens when a transient reduction in power converter load occurs and the duty cycle of output signal 422 is reduced until a new stable duty cycle is reached. It is noted that under certain transient load conditions, the feedback signal level may transiently be greater than or less than voltage threshold values 201 and 301 for the entire period $T_{FB}$ 205 and 305. Under these conditions feedback capacitor 460 in FIG. 4 is either charged or discharged for the entire period $T_{FB}$ 205 and 305 for as long as this condition exists. The effect on the duty cycle of signal 422 is to return the feedback signal to a level where the feedback signal value is greater than threshold values 201 an 301 for a portion of period $T_{FB}$ 205 and 305 and less than threshold values 201 and 301 for the remainder of time period $T_{FB}$ 205 and 305.

It is noted that although the circuit of FIG. 4 varies duty cycle of output signal 422 by comparing voltage $V_{PWM}$ 464 with reference PWM ramp signal 462, in a manner sometimes referred to as voltage mode control, there are many ways that this duty cycle control could be accomplished. For instance, in one example, a threshold to be compared to the current flowing in the power switch 105 could be made proportional to the $V_{PWM}$ 464 voltage, which would also result in increased power switch duty cycle with increasing $V_{PWM}$ 464 voltage in a manner sometimes referred to as current mode control. In another example, the switching period T 212 in FIG. 2 and 312 in FIG. 3 could be made inversely proportional to the $V_{PWM}$ 464 voltage while holding the power switch on time period 204 or 304 in FIGS. 2 and 3 respectively, substantially constant, which again would also result in increased power switch duty cycle with increasing $V_{PWM}$ 464 voltage in a manner sometimes referred to as variable frequency control. In another example, any combination of these control techniques could be used to regulate power delivery from the input to the output of the power converter to regulate an output voltage of the power converter in accordance with the teachings of the present invention.

In accordance with the above description therefore, and with reference to FIGS. 1, 2, 3 and 4, in one example, control circuits 115 and 415 control switching of a power switch to regulate the time periods 207 and 210 of the feedback portion $T_{FB}$ 205, or the time periods 307 and 310 of the feedback portion $T_{FB}$ 305 that the respective feedback signal 114, 208, 308 or 416 are above a threshold value. The respective feedback signal 114, 208, 308 or 416, representative of a power converter output voltage is received only during the feedback portion $T_{FB}$ 205 or $T_{FB}$ 305 of an off time 206 or 306 of the power switch 105. In this way, the control circuit 115 in power converter 100 regulates power delivery from the input to the output of the power converter to regulate an output voltage of the power converter.

It is noted that by designing current sources I1 455 and I2 458 to be unequal, the value of variable K in FIGS. 3 and 4 can be any fraction. In one example, if the value of I2 458 is made less than the value of I1 455, the steady state condition for the voltage across feedback capacitor 460 is when the value of K is >0.5. The (K×$T_{FB}$) product 207 or 307 will then be greater than 50% of $T_{FB}$ 205 and 305 and the ((1−K)×$T_{FB}$) product 210 or 310 will then be less than 50% of $T_{FB}$ 205 and 305 in this example. In some examples there may be an advantage to selecting a value of K>0.5. For instance, one reason could be due to the inherent resistive voltage drop across diode 117 in FIG. 1. In particular, the resistive voltage drop across one example of diode 117 is lower toward the end of the feedback portion $T_{FB}$ 205 or 305 since the current flowing in the diode 117 is lower in this region. The resistive voltage drop is therefore lower so the feedback signal is more representative of the power converter output voltage 119 in this example.

In one example, the variable K is varied or modified according to the operating conditions of the power converter. For example, with reference to FIG. 1, in an application where the impedance of output connection 199 is relatively large, there can be an appreciable voltage drop across this connection often referred to as an output cable. In order to help maintain a stable supply voltage across the load 121 in such an example, output voltage 119 is increased as a function of increasing output current 120. In other examples the voltage dropped across output power diode 117 can vary as a function of the output current 120, when for example the peak primary current 104 flowing in power switch 105 is controlled as a way of regulating power delivery from an input of the power converter 100 to an output of the power converter in accordance with the teachings of the present invention. The circuit of FIG. 4 shows optional circuitry including a circuit block 471 and variable current source 470 that can be implemented to compensate for diode voltage drop or cable drop variations. The function of circuit block 471 is to output a signal 472 to control current source 470 such that the current I3 of current source 470 is increased as the $T_{FB}/T$ ratio of circuit block 471 increases.

In operation, the ratio of the output power diode 117 conduction time $T_{FB}$ 205 and 305 with the overall switching period T 212 and 312 is one indication of the magnitude of the power converter output current. If current source 470 current I3 is increased as the ratio $T_{FB}/T$ increases, then the value of variable K in FIGS. 2 and 3 is therefore also increased since transistor switch 456 needs to be on for less time to maintain the voltage on feedback capacitor 460. With reference for FIGS. 2 and 3 therefore, time periods 207 and 307 will increase as the current source 470 current I3 in FIG. 4 is increased in accordance with the teachings of the present invention. The effect is to effectively raise the average value of the feedback signal 208 and 308, which in turn raises the value of power converter output voltage 119. In an example application with this functionality, additional current I3 would represent approximately 0-5% of the main I1 455 current value, depending on the load conditions. The effect of the operation described above is that the time that the feedback signal 208 and 308 is above the threshold value 201 and 301 is varied according to a magnitude of the current Io 120 flowing in the power supply output terminals in accordance with the teachings of the present invention.

In other examples, the variable K could be changed based on other factors such as the temperature of one or more components included within the power converter or for example the ambient temperature in which the power converter is operating.

It is noted that in the above description, the specific way that the power converter 100 is regulated could alternatively be described in terms of the control circuit 115 and 415 controlling switching of the power switch 105 to regulate either one or both of the time periods 207 or 210 and/or time periods 307 or 310 of $T_{FB}$ 205 or $T_{FB}$ 305, respectively, in accordance with the present invention. Indeed, it is appreciated that by regulating the time period 207 of $T_{FB}$ 205, which is equal to $K \times T_{FB}$, the time period 210 of $T_{FB}$ 205 is also regulated, which is equal to $(1-K) \times T_{FB}$. Similarly, by regulating the time period 210 of $T_{FB}$ 205, the time period 207 of $T_{FB}$ 205 is also regulated.

Figure 5:
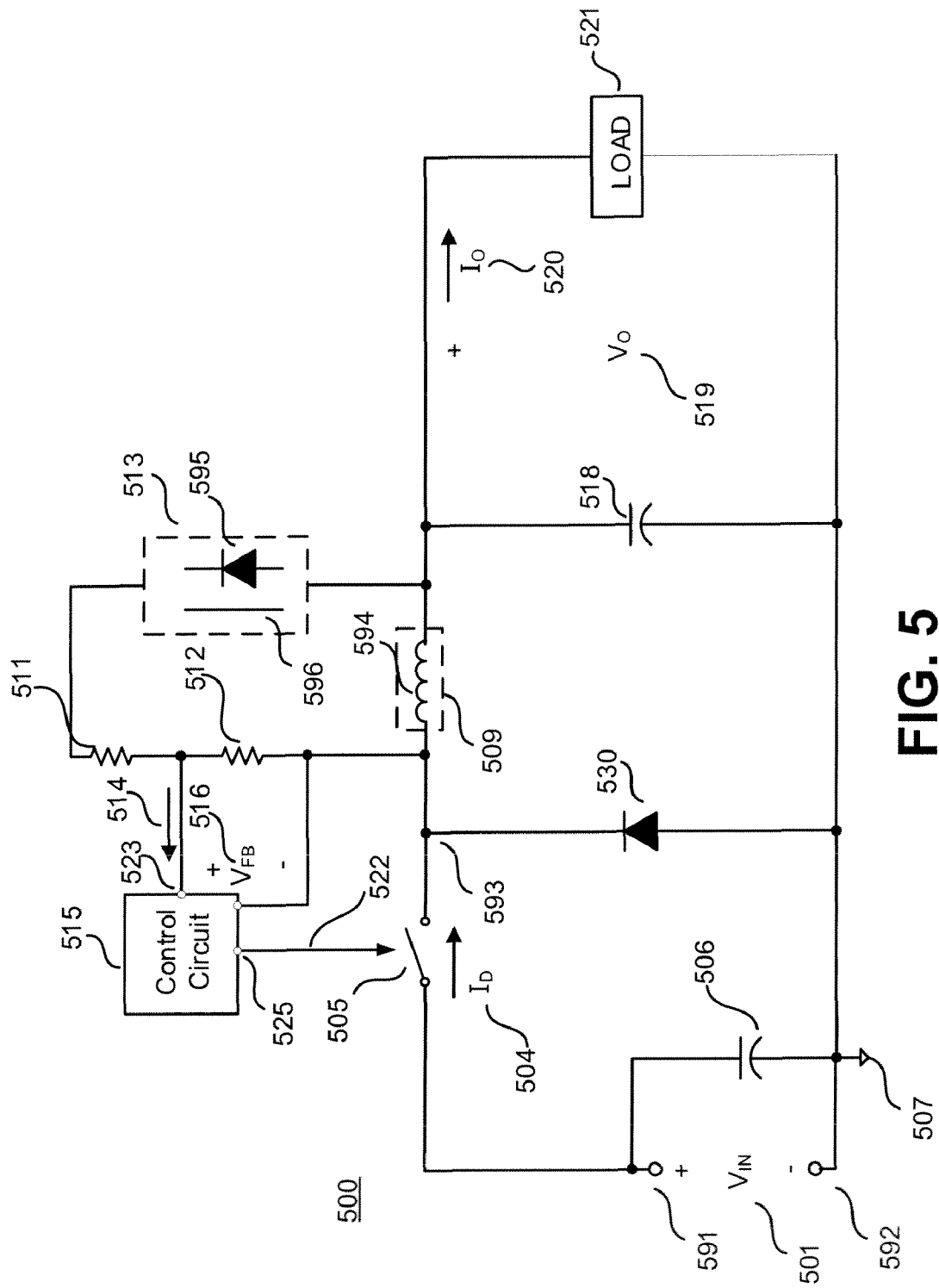
FIG. 5 is a schematic illustrating generally an example non-isolated power supply employing a control circuit responsive to a feedback signal that may regulate an output voltage of the power supply in accordance with the teachings of the present invention.

FIG. 5 shows a schematic 500 of an example non-isolated power converter in accordance with the teachings of the present invention. In the illustrated example, the non-isolated power converter shown is a buck converter. It is appreciated that other types of non-isolated power supplies may also benefit from the teachings of the present invention, including for example but not limited to boost converters, buck-boost converters, SEPIC converters, Ćuk converters or the like. In the illustrated example, control circuit 515 shares many aspects of its operation with the control circuits 115 and 415 described above. In one example, there is no requirement for an auxiliary winding on the energy transfer element and instead, a feedback signal 514 having a voltage value $V_{FB}$ 516 is coupled to the control circuit 515 from the main energy transfer element 509 winding 594.

In operation, when power switch 505 is on, current 504 flows between first 591 and second 592 input terminals of the power supply 500 through the energy transfer element 509 and the power switch 505. In one example power switch 505 is a MOSFET semiconductor switch, a bipolar transistor or the like. When power switch 505 is off, the voltage at node 593 drops to a value substantially equal to the ground voltage 507 minus the forward voltage drop across output power diode 530, which is coupled to energy transfer element 509, to sustain current flow in energy transfer element 509 during a feedback portion $T_{FB}$ of the power switch 505 off time. During this feedback portion $T_{FB}$ of the power switch 505 off time, which is when output power diode 530 is conducting current, the voltage across energy transfer element 509 is therefore equal to output voltage 519 plus a forward diode voltage drop across output power diode 530 and is therefore representative of the output voltage 519 during the feedback portion $T_{FB}$ of the power switch 505 off time. The current that flows in output power diode 530, is substantially equal to a sum of a current flowing in the output capacitor 518 and output current 520 flowing in the load 521. As shown in the example, the voltage across energy transfer element winding 594 is coupled through circuit block 513 and resistor divider formed by resistors 511 and 512 to feedback terminal 523 of control circuit 515 as a feedback signal 514.

In the illustrated example, the feedback signal 514 is coupled to control circuit 515 from energy transfer element 509 winding 594 only during the off time of power switch 505. In one example, circuit block 513 includes a diode 595 coupled to the main energy transfer element winding 594. During the on time of power switch 505, diode 595 is reverse biased and therefore prevents current flow in resistors 511 and 512.

In another example, circuit block 595 includes a substantially short circuit connection 596 as shown while still benefiting from the teachings of the present invention. In this example where circuit block 595 includes the substantially short circuit connection 596, a signal is applied to terminal 523 of control circuit 515 during the on time of the power switch 505. However this signal during the on time of the power switch 505 is not representative of the output voltage of the power converter. In an example where circuit block 513 comprises the substantially short circuit connection 596, the feedback signal 514 is still therefore only a feedback signal representative of the output voltage 519 of power converter 500 during the feedback portion $T_{FB}$ of the power switch 505 off time, which is while there is current flowing in output power diode 530. In one example of the buck converter circuit of FIG. 5, circuit block 513 includes a diode 595 to help ensure that the feedback signal 514 having the voltage value $V_{FB}$ 516 is a more accurate representation of output voltage 519, since the forward voltage drop across diode 595 tends to cancel the forward voltage drop across output power diode 530.

Thus, in one example, the principle of operation of control circuit 515 is similar to that of control circuits 115 and 415 above. The feedback portion $T_{FB}$ of power switch 505 off time ends when the current flowing in output power diode 530 falls to substantially zero value since the voltage across energy transfer element 509 is only representative of output voltage 519 while the current flowing in output power diode 530 is non-zero. The control circuit 515 is coupled to regulate the portions of the feedback portion $T_{FB}$ of power switch 505 off time that feedback voltage $V_{FB}$ 516 is above and below a threshold value that is generated within the control circuit 515. In one example the circuitry discussed with reference to FIG. 4 may be used to provide this operation.

Figure 6:
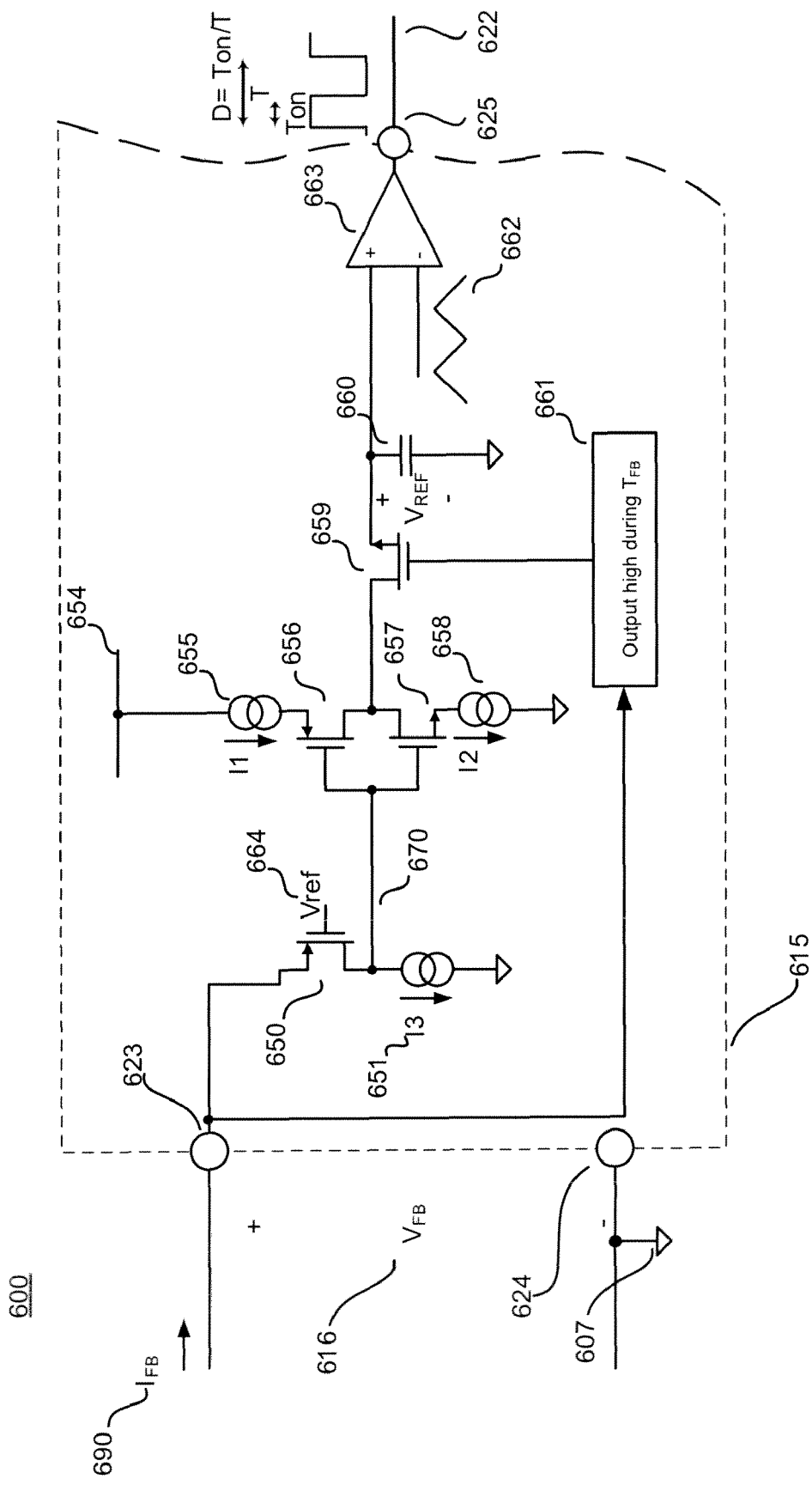
FIG. 6 is a more detailed schematic illustrating a portion of another example control circuit in accordance with the teachings of the present invention.

FIG. 6 shows generally a more detailed schematic of an example circuit 600 that in one example could form a portion of the internal circuitry of a control circuit 615, which in one example could be control circuit 115 in FIG. 1. The circuitry of FIG. 6 is one example of a circuit that when coupled to receive a feedback signal representative of an output voltage of a power converter during a feedback portion $T_{FB}$ of an off time of a power switch could be used to regulate power delivery from an input of a power converter to an output of the power converter.

As shown in the depicted example, control circuit 615 is coupled to receive a feedback current $I_{FB}$ 690 at feedback terminal 623. In one example, when feedback current $I_{FB}$ 690 flows, the voltage $V_{FB}$ 616 of the feedback terminal 623 relative to ground terminal 624 is substantially equal to a reference voltage Vref 664 plus the gate threshold voltage of p channel transistor 650. Feedback current $I_{FB}$ 690 flows through transistor 650 and current source 651.

In operation, if feedback current $I_{FB}$ 690 is greater than I3, the voltage applied to the gates of transistors 656 and 657 is high and transistor 657 is turned on. If feedback current signal $I_{FB}$ 690 is less than I3, the voltage applied to the gates of transistors 656 and 657 is low and transistor 656 is turned on. The remainder of the circuit operation and its influence on output signal 622 duty cycle from terminal 625 is similar to the circuitry described with respect to FIG. 4 above. A circuit of the type shown in FIG. 6 could in one example be used to eliminate the need for a resistor divider, or resistor 112 as shown in FIG. 1 or resistor 512 as shown in FIG. 5. The choice of the remaining feedback resistors 111 and 511 in FIGS. 1 and 5 respectively is then made based on the known feedback voltages $V_{FB}$ 116 and 516 in FIGS. 1 and 5, respectively, to regulate an output voltage of the power converter at a desired value. Although not shown in the schematic of FIG. 6, additional components to compensate for voltage drop in the connection between a power converter output and the load can be included, such as those described in connection with circuit elements 470 and 471 in FIG. 4 in accordance with the teachings of the present invention.

Figure 7:
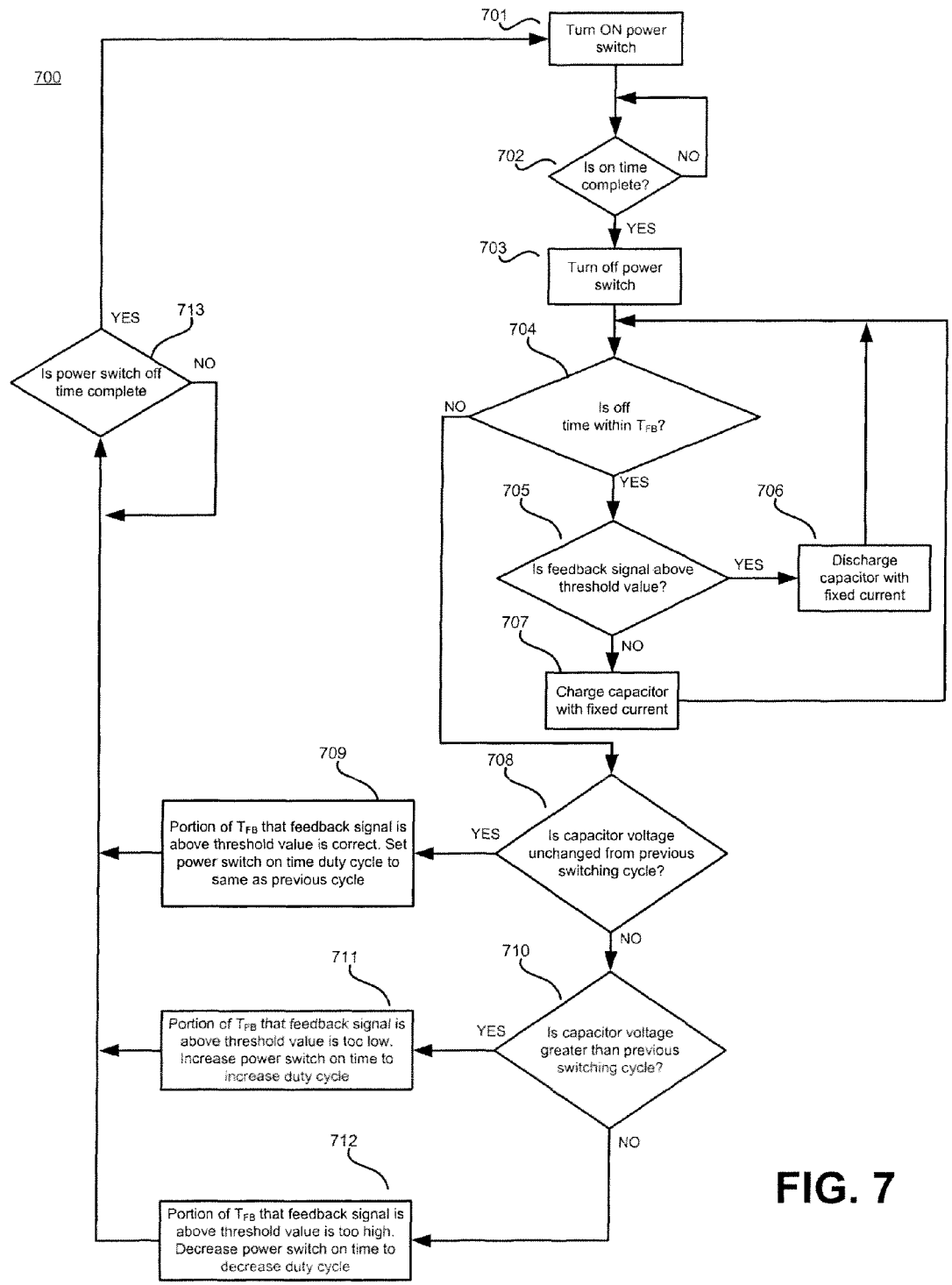
FIG. 7 is a flowchart illustrating an example method for regulating an output voltage of a power supply in accordance with the teachings of the present invention.

FIG. 7 shows generally a flowchart describing one example method of regulating power delivered from an input of a power converter to an output of the power converter. In the described method, the example power converter is similar to the power converters described above, in which there is switching of a power switch that is coupled to an energy transfer element coupled between the input and output of the power converter. In the example, the switching of the power switch is controlled with a control circuit coupled to the switch. A feedback signal is generated that is representative of a power converter output voltage during a feedback portion $T_{FB}$ of the power switch off time. The control circuit is responsive to the feedback signal and the control circuit is coupled to control the switching of the power switch to regulate the relative time periods the feedback signal is above and below a threshold during the feedback portion $T_{FB}$ of the power switch off time.

In particular, as shown in the illustrated example in block 701, the power switch is turned on. In bock 702, it is determined whether the on time of the power switch is complete. When the power switch on time is complete, block 703 indicates that the power switch is turned off. It is noted that completion of the power switch on time could be determined based on a variety of techniques such as for instance time measurement or based on the current flowing in the power switch reaching a threshold value to name a few examples.

In block 704, it is detected whether the off time of the power switch is within the feedback portion $T_{FB}$ of the power switch off time. If it is, it is detected in block 705 whether the feedback signal is above the threshold value. If the feedback signal is above the threshold value, the feedback capacitor is discharged in block 706 (which in one example may be feedback capacitor 460 in FIG. 4 or 660 in FIG. 6) with a fixed current. If the feedback signal is below the threshold value, the feedback capacitor is charged in block 707 with a fixed current.

When it is detected in block 704 that the feedback portion $T_{FB}$ of the power switch off time is complete, the voltage appearing across the feedback capacitor is detected in block 708. If this voltage is unchanged from the previous power switch switching cycle then the on time duty cycle of the power switch is left unchanged and processing is returned to block 701 through block 713, where again the power switch is turned on and the procedure is repeated. If, however, the feedback capacitor voltage is greater than the previous power switch switching cycle as detected in block 710, processing proceeds to block 711 the subsequent switching cycle on time is increased to increase duty cycle. It is noted that in other example control schemes, the power switch on time could also be held constant and the overall power switch switching cycle period could be reduced or a threshold of the current flowing in the power switch could be increased to increase duty cycle in accordance with the teachings of the present invention.

Continuing with the example, if it is detected in block 710 that the feedback capacitor voltage is less than the previous power switch switching cycle, processing proceeds to block 712 the subsequent switching cycle on time is decreased to decrease duty cycle. It is noted that in other control schemes, the power switch on time could also be held constant and the overall power switch switching cycle period increased to decrease duty cycle in accordance with the teachings of the present invention. It is noted that the flowchart of FIG. 7 indicates the detection of capacitor voltage in block 708 when the feedback portion $T_{FB}$ of the power switch off time is complete as detected in block 704. However in a circuit realization such as the examples shown in FIGS. 4 and 6, the duty cycle of the power switch is continuously determined by the voltage across feedback capacitors 460 and 660 throughout the switching cycle period of the power switch.

Using the example flowchart method of FIG. 7, therefore, the switching of the power switch can be controlled to regulate the portions of the feedback portion $T_{FB}$ of the power switch off time that the feedback signal is above and below a threshold value in accordance with the teachings of the present invention.

Figure 8:
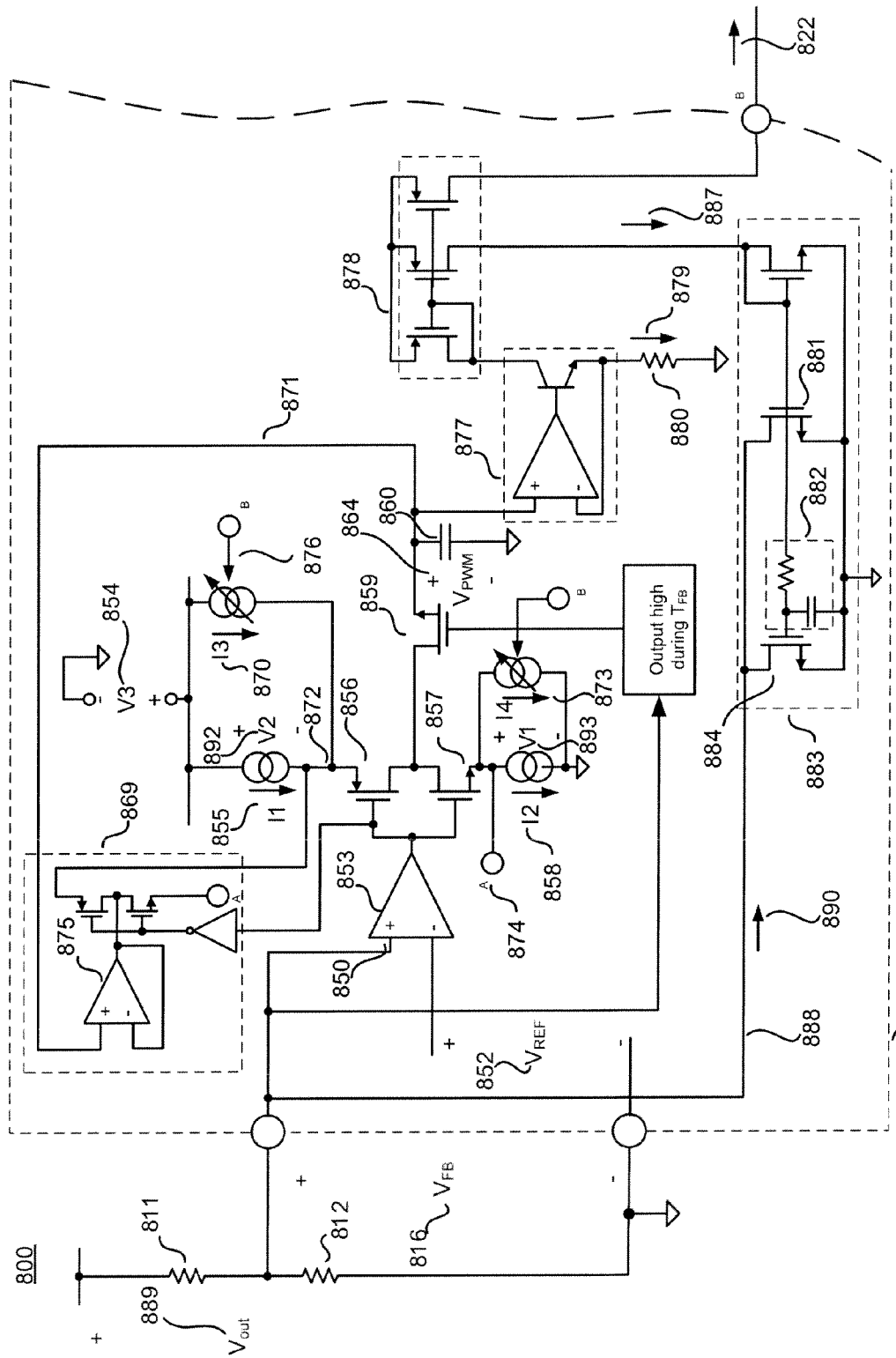
FIG. 8 shows a more detailed schematic of a portion of the internal circuitry of yet another example of a control circuit in accordance with the teachings of the present invention.

FIG. 8 shows a more detailed example schematic of a circuit 800 that in one example could form a portion of the internal circuitry of control circuit 815, which in one example could be control circuit 115 in FIG. 1 in accordance with the teachings of the present invention. The circuitry illustrated in FIG. 8 is another example of a circuit that, when coupled to receive a feedback signal representative of an output voltage of a power converter during a feedback portion $T_{FB}$ of an off time of a power switch, could regulate power delivery from an input of a power converter to an output of the power converter in accordance with the teachings of the present invention.

It will be noted that the circuit depicted in FIG. 8 shares many aspects with the example circuit of FIG. 4 and the description below will therefore focus primarily on the differences in the circuit of FIG. 8 compared to that in FIG. 4. As shown in the depicted example, control circuit 815 is coupled to receive a feedback signal $V_{FB}$ 816. As in the case of the circuit of FIG. 4, feedback voltage $V_{FB}$ 816 is compared to a reference voltage $V_{REF}$ 852 using comparator 853. In one example, reference voltage $V_{REF}$ 852 is equivalent to voltage threshold value 201 in FIG. 2 and voltage threshold value 301 in FIG. 3. The output of comparator 853 is coupled to drive transistor switches 856 and 857 to control a voltage 864 appearing across capacitor 860.

In common with the example circuit of FIG. 4, switch 859 is switched such that switch 859 is in an on state only during the feedback portion $T_{FB}$ of the power switch off time. Current can therefore only flow into or out of feedback capacitor 860 during feedback portion $T_{FB}$ of the power switch off time in the illustrated example. The voltage $V_{PWM}$ 864 appearing across feedback capacitor 860 is coupled to amplifier circuit 877, which regulates the voltage appearing across resistor 880 to be substantially equal to the voltage across feedback capacitor 860. The value of resistor 880 therefore sets the value of current 879, which is in turn therefore responsive to the voltage appearing across feedback capacitor 860. Current 879 is mirrored by current mirror 878 to produce control current signal 822 and compensation current signal 887. Control current signal 822 is therefore also responsive to the voltage appearing across capacitor 860.

In one example the duty cycle of power switch 105 in FIG. 1 is responsive to control current signal 822 that in one example could be coupled to control the duty cycle of power switch 105 in FIG. 1 in order to regulate power delivery from an input of a power converter to an output of the power converter in accordance with the teachings of the present invention. In one example the duty cycle of the power switch can be controlled by controlling the peak value of current 104 flowing in power switch 105 in FIG. 1. In another example the duty cycle of the power switch can be controlled by controlling a switching cycle period for example T 212 in FIG. 2 while keeping an on time Ton 204 substantially constant. In other examples, a combination of the above or other techniques can be used to control the duty cycle of the power switch in accordance with the teachings of the present invention.

The control circuit 815 therefore includes a first current source 858 that is coupled to discharge feedback capacitor 860 through first switch 857 during one portion of the feedback portion $T_{FB}$ of the off time of the power switch and a second current source 855 that is coupled to charge the feedback capacitor through second switch 856 during another portion of the feedback portion $T_{FB}$ of the off time of the power switch. In one example the control current signal 822 is coupled to be responsive to the voltage across the feedback capacitor 860 to control a duty cycle of the power switch to regulate power delivered from the input to the output of the power supply.

In one example, the control circuit 815 further includes a voltage stabilization circuit 869 coupled to maintain a first voltage V1 893 across the first current source 858 during an off time of the first switch 857 substantially equal to the voltage appearing across the feedback capacitor 860. In the example, the voltage stabilization circuit 869 is further coupled to maintain a second voltage V2 892 across the second current source 855 during an off time of the second switch 856 substantially equal to a difference between a control circuit supply voltage 854 and the voltage appearing across the feedback capacitor 860.

As shown in the depicted example, compensation current signal 887 is mirrored by current mirror circuit 883 in order to provide cable and diode drop compensation, as discussed above with reference to FIG. 4. As shown in the example of FIG. 8, the mirrored current signal 890 is coupled to non-inverting terminal 850 of comparator 853 with connection 888. Current 890 is a combination of diode drop compensation current flowing in transistor 881 and cable drop compensation current flowing in transistor 884. The relative magnitude of diode and cable drop compensation signals can be determined by the appropriate sizing of transistors 884 and 881. In one example, the low pass filter 882 is coupled to filter the cable drop compensation signal to improve power converter stability. In one example therefore, transistors 884 and 881 provide a parallel impedance to external feedback impedances 811 and 812, which in one example are equivalent to feedback resistors 111 and 112 in FIG. 1.

By varying the compensation current 890, the effective ratio of the resistor divider formed by resistors 811 and 812 is varied in turn varying the relationship between $V_{out}$ 889 and $V_{FB}$ 816, where $V_{out}$ is a voltage representative of an output of the power converter during an off time of the power switch, to compensate for cable and diode voltage drops in the output circuitry of the power converter. In one example, with the cable and diode drop compensation technique described above, the degree of compensation can be selected by the appropriate choice of external resistors 811 and 812. If low values of resistors 811 and 812 are chosen, the diode and cable drop compensation signal current 890 will have less effect than if larger values for external resistors 811 and 812 are chosen.

The example circuit of FIG. 8 also includes the voltage stabilization circuit block 869 used to increase the accuracy of circuit 815 if desired. Without the voltage stabilization circuit 869, the voltage across current sources 855 and 858 may change when the switches 856 and 857 turn on and off. This may introduce an initial error in charge and discharge currents of practical current source circuits when the switches 856 and 857 again turn on during the next power switch switching cycle. These initial current errors may reduce the accuracy with which charging and discharging currents flowing in capacitor 860 are established, which may reduce the accuracy with which the power converter output voltage is regulated.

In order to help maintain the voltage drop substantially constant whether switches 856 and 857 are on or off, voltage stabilization circuit 869 establishes a voltage at node 872 when switch 856 is off, that is substantially equal to the voltage at node 872 when switch 856 is on. Similarly circuit 869 establishes a voltage at node 874 when switch 857 is off, that is substantially equal to the voltage at node 874 when switch 857 is on. This performance is provided by the unity gain amplifier 875, the output of which is held at the voltage across feedback capacitor 860 through connection 871. The output of unity gain amplifier is coupled to node 872 when switch 856 turns off and is coupled to node 874 when switch 857 turns off. In this way, current sources 855 and 858 establish their regulated current value flowing in feedback capacitor 860 substantially immediately such that switches 856, 857 and 859 provide a current path for current to flow in feedback capacitor 860.

The circuit of FIG. 8 also shows parallel current sources 870 and 873 to current sources 855 and 858, respectively. In one example these current sources are responsive to the current control signal 822. In one example, current sources 870 and 873 are turned on when current control signal 822 reaches a threshold value. In one example the magnitude of current flowing in current sources 870 and 873 is responsive to the value of current control signal 822. In one example, parallel current sources 870 and 873 provide increased gain to increase the speed with which capacitor 860 is charged and discharged. In one example, this increased gain is used under light load conditions in the power converter operation when the duration of $T_{FB}$ 205 or 305 is very short. The increased gain provided with parallel current sources 870 and 873 helps improve the transient response of the power converter to changes in load conditions at the output of the power converter. In one example, current sources 870 and 873 provide currents substantially equal in value and substantially equal to up to 9 times the current values of current sources 855 and 858.

In the above descriptions of control circuits 415, 615 and 815, a duty cycle of a power switch to regulate an output of a power converter is responsive to a voltage across a capacitor 460, 660 and 860, respectively, in FIGS. 4, 6 and 8. It is noted, however, that the duty cycle of a power switch could alternatively be responsive to a value of a digital counter circuit while still benefiting from the teachings of the present invention. In one example a digital counter circuit could be decremented at a frequency higher than the power switch switching frequency, for the portion of the feedback portion $T_{FB}$ of the off time of the power switch that the feedback signal is above a threshold value and incremented at a frequency higher than the power switch switching frequency, for the portion of the feedback portion $T_{FB}$ of the off time of the power switch that the feedback signal is below a threshold value, where the switching frequency is the reciprocal of the power switch switching cycle period. In this example, the value of the digital counter count at the end of the feedback portion $T_{FB}$ of the off time of the power switch could then be used to set a duty cycle of the power switch for one or more forthcoming switching cycle periods. It is noted that other techniques could be used as alternatives to the above descriptions for regulating the portions of the feedback portion $T_{FB}$ of the power switch off time that the feedback signal is above and below the threshold value while still benefiting from the broader teachings of the present invention.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific voltages, currents, frequencies, power range values, times, etc., are provided for explanation purposes and that other values may also be employed in other embodiments and examples in accordance with the teachings of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. A control circuit for use in a power supply, comprising:
   a signal generator coupled to generate an output signal to control switching of a power switch to be coupled to the control circuit; and
   a feedback circuit coupled to receive a feedback signal which is representative of an output of the power supply during a feedback portion of an off time of the power switch, wherein the signal generator generates the output signal in response to the feedback circuit to control a fraction of the feedback portion of the off time of the power switch that the feedback signal is above a threshold and another fraction of the feedback portion of the off time of the power switch that the feedback signal is below the threshold.

2. The control circuit of claim 1 wherein the feedback circuit comprises a feedback capacitor coupled to be discharged when the feedback signal is above a threshold during the feedback portion of the off time of the power switch and wherein the feedback capacitor is coupled to be charged when the feedback signal is below the threshold during the feedback portion of the off time of the power switch.

3. The control circuit of claim 2 wherein the feedback circuit further comprises first and second current sources coupled to charge and discharge the feedback capacitor in response to the feedback signal.

4. The control circuit of claim 3 further comprising a voltage stabilization circuit coupled to the first and second current sources to stabilize first and second voltages across the first and second current sources, respectively.

5. The control circuit of claim 1 wherein the feedback signal is a feedback voltage.

6. The control circuit of claim 1 wherein the feedback signal is a feedback current.

7. The control circuit of claim 1 wherein the signal generator comprises a pulse width modulator comparator.

8. The control circuit of claim 1 further comprising a cable drop compensation circuit coupled to the feedback circuit and the signal generator to compensate for a voltage drop due to cable impedance in an output of the power supply.

9. The control circuit of claim 1 further comprising a diode drop compensation circuit coupled to the feedback circuit and the signal generator to compensate for a voltage drop due to diode impedance in an output of the power supply.

10. A control circuit for use in a power supply, comprising:
    a signal generator coupled to generate an output signal to control switching of a power switch to be coupled to the control circuit; and
    a feedback circuit coupled to receive a feedback signal which is representative of an output of the power supply during a feedback portion of an off time of the power switch, wherein the signal generator generates the output signal in response to the feedback circuit to control a fraction of the feedback portion of the off time of the power switch that the feedback signal is above a threshold and another fraction of the feedback portion of the off time of the power switch that the feedback signal is below the threshold,
    wherein said feedback circuit further comprises a feedback capacitor and first and second current sources coupled to charge and discharge the feedback capacitor in response to the feedback signal; and
    a voltage stabilization circuit coupled to the feedback circuit to stabilize first and second voltages across the first and second current sources.

11. The control circuit of claim 10 wherein the voltage stabilization circuit comprises an amplifier having an input coupled to the feedback capacitor, wherein the amplifier has an output that is coupled to either the first current source or the second current source in response to whether the feedback capacitor is coupled to be charged or discharged, respectively.

12. The control circuit of claim 10 further comprising a cable drop compensation circuit coupled to the feedback circuit and the signal generator to compensate for a voltage drop due to cable impedance in an output of the power supply.

13. The control circuit of claim 10 further comprising a diode drop compensation circuit coupled to the feedback circuitry and the signal generator to compensate for a voltage drop due to diode impedance in an output of the power supply.

14. The control circuit of claim 10 wherein the feedback signal is a feedback voltage.

15. The control circuit of claim 10 wherein the feedback signal is a feedback current.

16. A control circuit for use in a power supply, comprising:
- a signal generator coupled to generate an output signal to control switching of a power switch to be coupled to the control circuit; and
- a feedback circuit coupled to receive a feedback signal which is representative of an output of the power supply during a feedback portion of an off time of the power switch, wherein the signal generator generates the output signal in response to the feedback circuit to control a fraction of the feedback portion of the off time of the power switch that the feedback signal is above a threshold and another fraction of the feedback portion of the off time of the power switch that the feedback signal is below the threshold; and
- a cable drop compensation circuit coupled to the feedback circuit and the signal generator to compensate for a voltage drop due to a cable impedance in an output of the power supply.

17. The control circuit of claim 16 wherein the cable drop compensation circuit comprises:
- a current mirror circuit coupled to conduct a cable drop compensation current signal that is responsive to the feedback signal; and
- a filter coupled to the current mirror circuit.

18. The control circuit of claim 16 wherein the feedback circuit comprises a feedback capacitor coupled to be discharged when the feedback signal is above a threshold during the feedback portion of the off time of the power switch and wherein the feedback capacitor is coupled to be charged when the feedback signal is below the threshold during the feedback portion of the off time of the power switch and first and second current sources coupled to charge and discharge the feedback capacitor in response to the feedback signal.

19. The control circuit of claim 18 further comprising a voltage stabilization circuit coupled to the first and second current sources to stabilize first and second voltages across the first and second current sources, respectively.

20. The control circuit of claim 16 further comprising a diode drop compensation circuit coupled to the feedback circuitry and the signal generator to compensate for a voltage drop due to a diode impedance in an output of the power supply.

21. The control circuit of claim 16 wherein the feedback signal is a feedback voltage.

22. The control circuit of claim 16 wherein the feedback signal is a feedback current.

23. A control circuit for use in a power supply, comprising:
- a signal generator coupled to generate an output signal to control switching of a power switch to be coupled to the control circuit; and
- a feedback circuit coupled to receive a feedback signal which is representative of an output of the power supply during a feedback portion of an off time of the power switch, wherein the signal generator generates the output signal in response to the feedback circuit to control a fraction of the feedback portion of the off time of the power switch that the feedback signal is above a threshold and another fraction of the feedback portion of the off time of the power switch that the feedback signal is below the threshold; and
- a diode drop compensation circuit coupled to the feedback circuit and the signal generator to compensate for a voltage drop due to a diode impedance in an output of the power supply.

24. The control circuit of claim 23 wherein the diode drop compensation circuit comprises a current mirror circuit coupled to conduct a diode drop compensation current signal that is responsive to the feedback signal.

25. The control circuit of claim 23 wherein the feedback circuit comprises a feedback capacitor coupled to be discharged when the feedback signal is above a threshold during the feedback portion of the off time of the power switch and wherein the feedback capacitor is coupled to be charged when the feedback signal is below the threshold during the feedback portion of the off time of the power switch and first and second current sources coupled to charge and discharge the feedback capacitor in response to the feedback signal.

26. The control circuit of claim 25 further comprising a voltage stabilization circuit coupled to the first and second current sources to stabilize first and second voltages across the first and second current sources, respectively.

27. The control circuit of claim 23 further comprising a cable drop compensation circuit coupled to the feedback circuitry and the signal generator to compensate for a voltage drop due to a cable impedance in an output of the power supply.

28. The control circuit of claim 23 wherein the feedback signal is a feedback voltage.

29. The control circuit of claim 23 wherein the feedback signal is a feedback current.

30. A control circuit for use in a power supply, the control circuit to be coupled to a power switch and coupled to receive a feedback signal which is representative of an output voltage of the power supply during a feedback portion of an off time of the power switch,
- wherein the feedback signal is above a threshold during a fraction of the feedback portion of the off time of the power switch,
- wherein the feedback signal is below the threshold during another fraction of the feedback portion of the off time of the power switch, and
- wherein the control circuit is coupled to control switching of the power switch to regulate said fractions of the feedback portion of the off time of the power switch.

31. The control circuit of claim 30 further comprising a feedback capacitor coupled to be discharged when the feedback signal is above a threshold during the feedback portion of the off time of the power switch and wherein the feedback capacitor is coupled to be charged when the feedback signal is below the threshold during the feedback portion of the off time of the power switch and first and second current sources coupled to charge and discharge the feedback capacitor in response to the feedback signal.

32. The control circuit of claim 31 further comprising a voltage stabilization circuit coupled to the first and second current sources to stabilize first and second voltages across the first and second current sources, respectively.

33. The control circuit of claim 30 further comprising a cable drop compensation circuit coupled to receive the feedback signal and to compensate for a voltage drop due to a cable impedance in an output of the power supply.

34. The control circuit of claim 30 further comprising a diode drop compensation circuit coupled to receive the feedback signal and to compensate for a voltage drop due to a diode impedance in an output of the power supply.

35. The control circuit of claim 30 wherein the feedback signal is a feedback voltage.

36. The control circuit of claim 30 wherein the feedback signal is a feedback current.

37. A control circuit for use in a power supply, the control circuit to be coupled to a power switch and coupled to receive a feedback signal which is representative of an output voltage of the power supply during a feedback portion of an off time of the power switch,
wherein the feedback signal is above a threshold during a fraction of the feedback portion of the off time of the power switch,
wherein the feedback signal is below the threshold during another fraction of the feedback portion of the off time of the power switch,
wherein the control circuit is coupled to control switching of the power switch to regulate said fractions of the feedback portion of the off time of the power switch,
wherein the control circuit further includes a feedback capacitor and first and second current sources coupled to charge and discharge the feedback capacitor in response to the feedback signal, and
wherein the control circuit further includes a voltage stabilization circuit coupled to stabilize first and second voltages across the first and second current sources.

38. The control circuit of claim 37 further comprising a cable drop compensation circuit coupled to receive the feedback signal and to compensate for a voltage drop due to a cable impedance in an output of the power supply.

39. The control circuit of claim 37 further comprising a diode drop compensation circuit coupled to receive the feedback signal and to compensate for a voltage drop due to a diode impedance in an output of the power supply.

40. The control circuit of claim 37 wherein the feedback signal is a feedback voltage.

41. The control circuit of claim 37 wherein the feedback signal is a feedback current.

42. A control circuit for use in a power supply, the control circuit to be coupled to a power switch and coupled to receive a feedback signal which is representative of an output voltage of the power supply during a feedback portion of an off time of the power switch,
wherein the feedback signal is above a threshold during a fraction of the feedback portion of the off time of the power switch,
wherein the feedback signal is below the threshold during another fraction of the feedback portion of the off time of the power switch,
wherein the control circuit is coupled to control switching of the power switch to regulate said fractions of the feedback portion of the off time of the power switch,
wherein the control circuit includes a cable drop compensation circuit coupled to receive the feedback signal and to compensate for a voltage drop due to a cable impedance in an output of the power supply.

43. The control circuit of claim 42 wherein the cable drop compensation circuit comprises:
a current mirror circuit coupled to conduct a cable drop compensation current signal that is responsive to the feedback signal; and
a filter coupled to the current mirror circuit.

44. The control circuit of claim 42 further comprising a feedback capacitor coupled to be discharged when the feedback signal is above a threshold during the feedback portion of the off time of the power switch and wherein the feedback capacitor is coupled to be charged when the feedback signal is below the threshold during the feedback portion of the off time of the power switch and first and second current sources coupled to charge and discharge the feedback capacitor in response to the feedback signal.

45. The control circuit of claim 44 further comprising a voltage stabilization circuit coupled to the first and second current sources to stabilize first and second voltages across the first and second current sources, respectively.

46. The control circuit of claim 42 further comprising a diode drop compensation circuit coupled to receive the feedback signal and to compensate for a voltage drop due to a diode impedance in an output of the power supply.

47. The control circuit of claim 42 wherein the feedback signal is a feedback voltage.

48. The control circuit of claim 42 wherein the feedback signal is a feedback current.

49. A control circuit for use in a power supply, the control circuit to be coupled to a power switch and coupled to receive a feedback signal which is representative of an output voltage of the power supply during a feedback portion of an off time of the power switch,
wherein the feedback signal is above a threshold during a fraction of the feedback portion of the off time of the power switch,
wherein the feedback signal is below the threshold during another fraction of the feedback portion of the off time of the power switch,
wherein the control circuit is coupled to control switching of the power switch to regulate said fractions of the feedback portion of the off time of the power switch,
wherein the control circuit includes a diode drop compensation circuit coupled to receive the feedback signal and to compensate for a voltage drop due to a diode impedance in an output of the power supply.

50. The control circuit of claim 49 wherein the diode drop compensation circuit comprises a current mirror circuit coupled to conduct a diode drop compensation current signal that is responsive to the feedback signal.

51. The control circuit of claim 49 further comprising a feedback capacitor coupled to be discharged when the feedback signal is above a threshold during the feedback portion of the off time of the power switch and wherein the feedback capacitor is coupled to be charged when the feedback signal is below the threshold during the feedback portion of the off time of the power switch and first and second current sources coupled to charge and discharge the feedback capacitor in response to the feedback signal.

52. The control circuit of claim 51 further comprising a voltage stabilization circuit coupled to the first and second current sources to stabilize first and second voltages across the first and second current sources, respectively.

53. The control circuit of claim 49 further comprising a cable drop compensation circuit coupled to receive the feedback signal and to compensate for a voltage drop due to a cable impedance in an output of the power supply.

54. The control circuit of claim 49 wherein the feedback signal is a feedback voltage.

55. The control circuit of claim 49 wherein the feedback signal is a feedback current.

56. A control circuit for use in a power supply, comprising:
a signal generator coupled to generate an output signal to control switching of a power switch to be coupled to the control circuit;
feedback circuitry coupled to receive a feedback signal which is representative of an output of the power supply during a feedback portion of an off time of the power switch, wherein the signal generator generates the output signal in response to the feedback signal to regulate a fraction of the feedback portion of the off time of the power switch that the feedback signal is above a threshold and another fraction of the feedback portion of the off time of the power switch that the feedback signal is below the threshold value; and wherein the feedback circuitry further comprises a feedback capacitor coupled to be discharged when the feedback signal is above a threshold during the feedback portion of the off time of the power switch and wherein the feedback capacitor is coupled to be charged when the feedback signal is below the threshold during the feedback portion of the off time of the power switch.

57. The control circuit of claim 56 wherein the feedback circuitry further comprises first and second current sources coupled to charge and discharge the feedback capacitor in response to the feedback signal.

58. The control circuit of claim 57 further comprising a voltage stabilization circuit coupled to the first and second current sources to stabilize first and second voltages across the first and second current sources, respectively.

59. The control circuit of claim 56 further comprising cable drop compensation circuitry coupled to the feedback circuitry and the signal generator to compensate for a voltage drop due to a cable impedance in an output of the power supply.

60. The control circuit of claim 56 further comprising diode drop compensation circuitry coupled to the feedback circuitry and the signal generator to compensate for a voltage drop due to a diode impedance in an output of the power supply.

61. A control circuit for use in a power supply, comprising:
a signal generator coupled to generate an output signal to control switching of a power switch to be coupled to the control circuit;
feedback circuitry coupled to receive a feedback signal representative of an output of the power supply during a feedback portion of an off time of the power switch, wherein the signal generator generates the output signal in response to the feedback signal to regulate a fraction of the feedback portion of the off time of the power switch that the feedback signal is above a threshold and another fraction of the feedback portion of the off time of the power switch when the feedback signal is below the threshold; and
wherein the signal generator further comprises a pulse width modulator comparator coupled to generate the output signal to control the switching of the power switch.

62. The control circuit of claim 61 wherein the feedback circuitry comprises a feedback capacitor coupled to the pulse width modulator comparator and coupled to be discharged when the feedback signal is above a threshold during the feedback portion of the off time of the power switch and wherein the feedback capacitor is coupled to be charged when the feedback signal is below the threshold during the feedback portion of the off time of the power switch and first and second current sources coupled to charge and discharge the feedback capacitor in response to the feedback signal.

63. The control circuit of claim 62 further comprising a voltage stabilization circuit coupled to the first and second current sources to stabilize first and second voltages across the first and second current sources, respectively.

64. The control circuit of claim 61 further comprising cable drop compensation circuitry coupled to the feedback circuitry and the signal generator to compensate for a voltage drop due to a cable impedance in an output of the power supply.

65. The control circuit of claim 61 further comprising diode drop compensation circuitry coupled to the feedback circuitry and the signal generator to compensate for a voltage drop due to a diode impedance in an output of the power supply.

66. A power supply, comprising:
an energy transfer element coupled between a power supply input and a power supply output;
a power switch coupled to the energy transfer element such that a current flows through the energy transfer element and the power switch when the power switch is on; and
a control circuit coupled to the power switch and coupled to receive a feedback signal which is representative of an output of the power supply during a feedback portion of an off time of the power switch, wherein the feedback signal is above a threshold during a fraction of the feedback portion of the off time of the power switch and the feedback signal is below the threshold during another fraction of the feedback portion of the off time of the power switch, and wherein the control circuit is coupled to control switching of the power switch to regulate said fractions of the feedback portion of the off time of the power switch.

67. A method, comprising:
controlling the switching of a power switch to regulate an output of a power converter;
generating a feedback signal which is representative of the power converter output during a feedback portion of an off time of the power switch, wherein the feedback signal is above a threshold during a fraction of the feedback portion of the off time of the power switch and the feedback signal is below the threshold during another fraction of the feedback portion of the off time of the power switch; and
responding to the feedback signal to control the switching of the power switch to regulate said fractions of the feedback portion of the off time of the power switch.

* * * * *